Patented Aug. 8, 1950

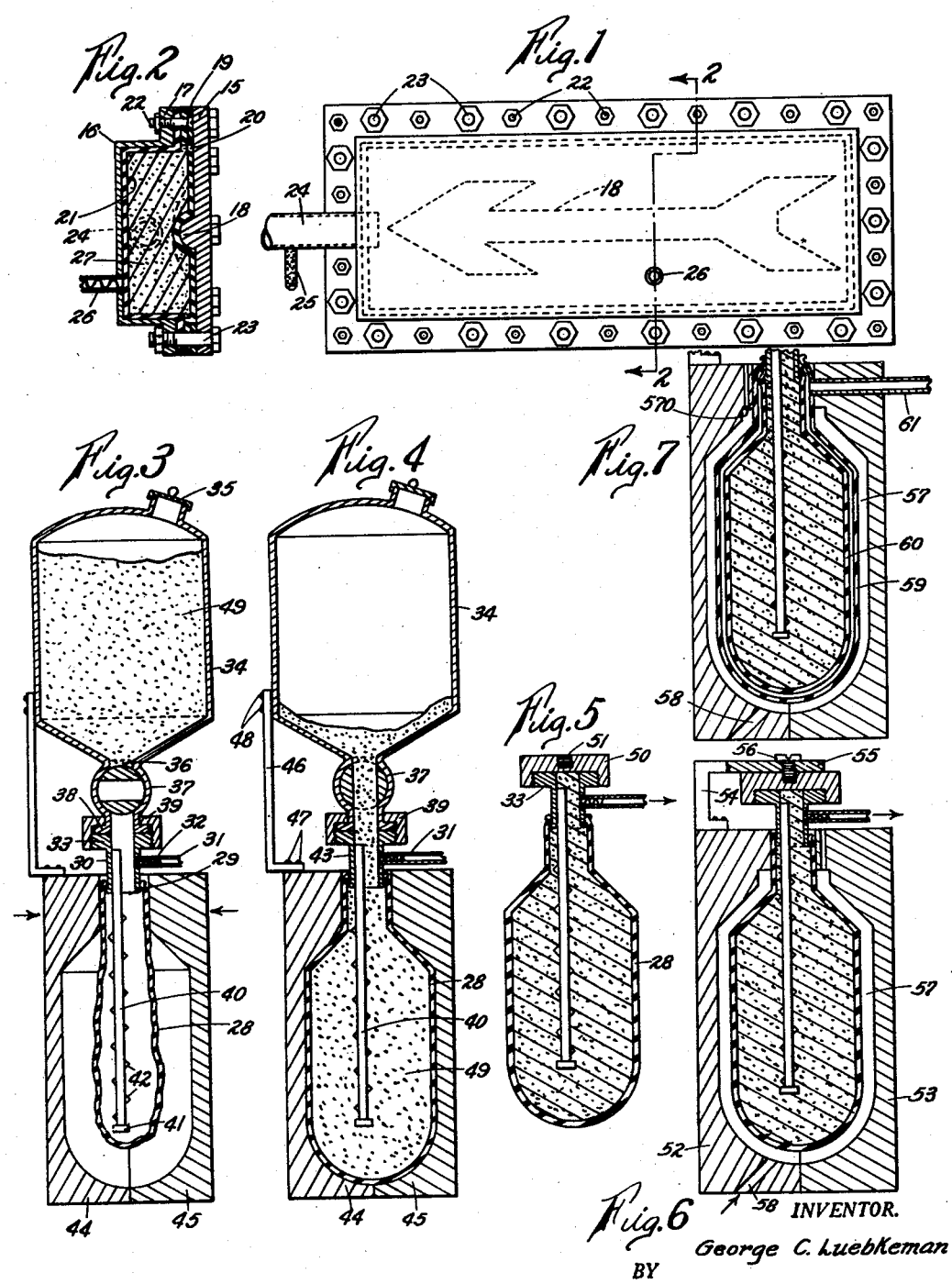

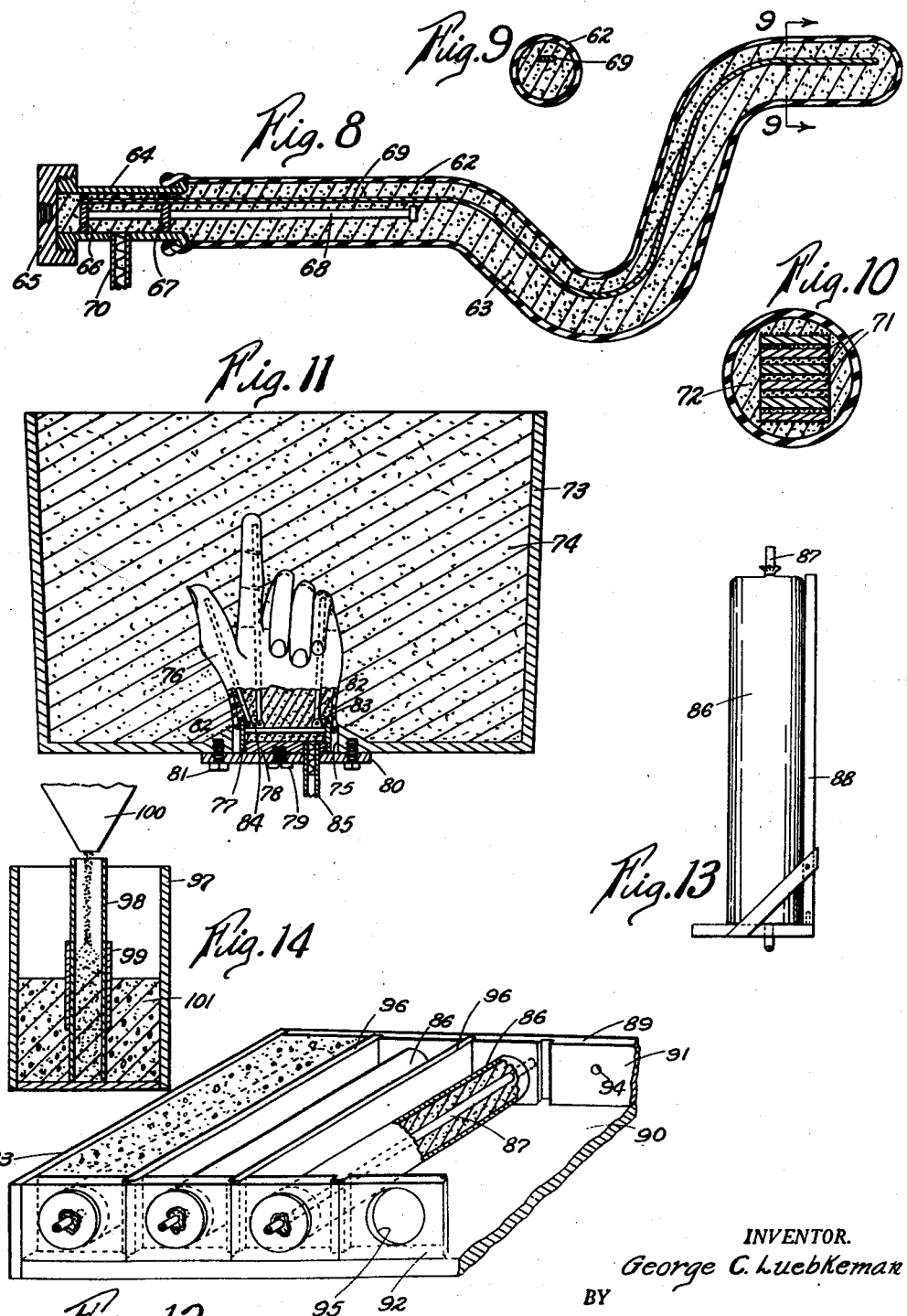

2,517,902

UNITED STATES PATENT OFFICE 2,517,902

MOLDING PROCESS AND MEANS

George C. Luebkeman, Cincinnati, Ohio

Application August 31, 1944, Serial No. 552,181

17 Claims. (Cl. 18—5)

This invention has to do with the making of temporary shapes and is particularly concerned with the formation of molds and cores used in the molding processes, such as plastics and cast materials.

An object of the invention is to provide a mold, shape, or core formed of powdered or granular material covered by or embraced in pliable covering or containing means, and means for applying external pressure upon the body of granular material for causing the latter to became substantially rigid during the time that the mold or core is in use.

Another object is to provide a molding means and process of the kind indicated in which differential pressures are applied to the inside and outside of the formed core for giving added strength and rigidity to the same whereby the core is enabled to withstand considerable pressures imposed thereon by the material being molded, without undergoing any modification of shape.

Another object is to provide means and processes for forming constructions cf irregular shape both interiorly and exteriorly.

Another object is to provide a novel process and means for substantially rigidifying a container of fluent material, such as sand, by the imposition of negative pressure therein and also by the use of flexible members disposed within the fluent material and rendered substantially rigid by the negative pressure.

It is a further object to accomplish these various processes and means through expedients simple in structure and operation.

These and other objects are attained by the means described herein and illustrated in the accompanying drawing in which:

Fig. 1 is a plan view of a mold-forming means of the present invention.

Fig. 2 is a cross-sectional view on line 2—2 of Fig. 1.

Figs. 3 and 4 are vertical cross-sectional views of mold or core-forming means of the present invention at successive stages of use.

Fig. 5 is a vertical cross-sectional view of the core proper, of the present invention, removed from the die utilized in its formation and provided with a cap adapted for suspending or positioning a core in a mold.

Fig. 6 is a vertical cross-sectional view showing the device of Fig. 5 positioned in a mold in readiness for use.

Fig. 7 is a view similar to Fig. 6, with some of the top structure broken away and showing a modified form of molding apparatus.

Fig. 8 is a longitudinal cross-sectional view through a molding core of this invention, of irregular or curved formation and illustrating the use of stiffening means utilized in this form of the invention.

Fig. 9 is a cross-sectional view on line 9—9 of Fig. 8.

Fig. 10 is a cross-sectional view similar to Fig. 9, but showing a modification of the stiffening means.

Fig. 11 is a vertical cross-sectional view through a modified form of apparatus used in shaping a mold of irregular configuration.

Fig. 12 is a perspective view, with parts broken away, of means for forming hollow plastic construction, utilizing a different form of core.

Fig. 13 is an end view of a rack or frame for holding the containers utilized in the formation of the cores seen in Fig. 12.

Fig. 14 is a cross-sectional view illustrating another modified form of the invention and its use.

One of the great problems in molding is the formation and positioning of cores or molds and the removal thereof after the molding operations. Various expedients have been utilized heretofore and have been found generally difficult and undesirable in use as entailing injury either to the formed objects or the forming apparatus. For example, the present use of alloys as molding cores requires that the alloy be of higher melting point than the heated plastic formed around the core. Yet after the molding operation, in order to melt out the core, it is necessary to employ a temperature high enough for that purpose, which is, therefore, higher than the melting point of the molded object, with the result of possible injury to the latter. Other difficulties involved in this field have been the formation of curved or irregular shapes in connection with which it has been necessary to form the different parts of a single object separately, subsequently suitably joining them, as by fusion.

These and many other difficulties well-known to those skilled in the art, have been obviated by the present invention which might be termed a "soft core" method and which comprises the use of pliable covers or containers for a granular mass which is shaped in the desired form and temporarily, for the necessary length of time, rigidified or solidified in this form by the use of external pressures applied thereto.

In greater detail, and with reference to the drawings, the apparatus seen in Figs. 1 and 2 comprises a base 15 of generally rectangular shape, and having disposed thereon a cover member 16 formed with edge flanges 17. The inner face of the base 15 has thereon, or is formed with a raised shape such as the arrow 18, of which shape it is desired to form a mold.

On the base 15 and between it and the flanges 17, is positioned a rectangular frame 19 and this in turn, has disposed between it and flanges 17, the edge portions of a pair of pliable air-tight membranes or sheet members 20 and 21 which sheet members are desirably at least slightly stretchable when small details of shape and form are required to be reproduced. The frame 19, the membranes 20 and 21 and the flanges 17 are all secured together by suitable means such as threaded bolts 22, and this whole unit of structure, disposed on the base 15, is secured to the latter by suitable means such as longer threaded bolts 23, passing through all of the said members.

An end of the cover member 16 is provided with a conduit 24 for communicating with the interior of said cover member, in the space between the two membranes or sheet members 20 and 21. The conduit 24 has a lateral air passage 25 associated therewith, the latter being provided with a suitable filter.

The top of the cover member 16 may have an air connection 26 giving access to the interior of said cover member and to the outer face of the membrane 21.

This form of the invention is used by introducing granular material 27 through the conduit 24 onto the upper face of the membrane 20 and settling it, as by tapping. Thereafter the conduit is closed and negative air pressure applied through the air passage 25 whereby movement of the grains of the mass of material 24, relative to one another, is substantially precluded and the mass of material is rigidified against the upper face of the membrane 20 which, by virtue of the granular material, snugly covers the shape 18 and thus assumes the form of the latter.

Where it is desired to apply a greater pressure to the mass of granular material 27, the membrane or cover member 21 is called into play. Positive pressure is introduced through the passage 26 against the outer face of the membrane 21 so that the mass of granular material is forced and compacted against the upper or top face of the lower cover member 20. The pressure may be hydraulic.

Suitable valves, not shown, in the passages 25 and 26 are now closed and the long threaded bolts 23 may now be removed for exposing the countersunk shape provided in the lower face of the membrane 20. This countersunk portion may be utilized directly as a mold for forming articles having the characteristics of the shape 18 or for forming molds or cores utilized in subsequent molding operations.

After the mold-forming means illustrated in Figs. 1 and 2 have been thus employed, the pressures may be released, whereupon the granular material becomes fluent again and may be poured out through the conduit 24.

It may be remarked at this point that a pair of pliable sheet or membrane members such as those disclosed in Fig. 1, or of any other desired outline, may be connected at their edges and the container thus formed provided with an inlet for the introduction of granular material and the application of air pressure. This simplified form of the invention may have any desired shape imparted thereto, such for example, a toy, or a stage property, and by the application and maintenance of a vacuum applied interiorly of the container, the shape may be kept for any desired length of time, and then changed at will.

Referring now to Figs. 3 through 6, there is disclosed therein a pliable air-tight container 28, of sack-like character having an open end attached as at 29 to one end of a connection 30. This connection has lateral air passage 31 provided interiorly with a filter 32, and preferably having associated therewith a suitable control valve, not shown. The upper end of the connection 30 terminates in an exteriorly threaded flange 33.

The container 28 and connection 30 just described, are adapted to be associated with a supply tank 34 holding granular material and provided at the top with an air-tight inlet 35 for the introduction of the granular material into the tank. At the lower end the latter is preferably tapered and formed with an outlet 36 having a control valve 37 associated therewith. The lower end of the valve is developed into flange 38 which is embraced by and retains in place, a rotatable interiorly threaded collar 39, which, when the flanges 33 and 38 have been placed in abutment, is screwed on to the flange 33 for forming an air-tight connection between the tank 34 and the container or sack 28. A stiffening member 40 extends into the sack-like container 28 and is shown as provided with an end stop 41 and lateral projections 42, for a purpose to be described. The upper end of the stiffening member may be secured as at 43 to the interior of the connection 30.

The structural details just described are designed to cooperate with a die or mold into which the pliable container 28 is receivable. Such a die or mold is shown herein as comprised of two parts 44 and 45, adapted to be connected in use by suitable securing means. One of the members 44 of the mold may have a bracket 46 removably secured to its top as by bolts 47. The upper end of this bracket is attached to the side of the reservoir or tank 34 as by removable connections 48, so that the said mold and tank 34, as well as the other associated parts, including the sack-like container 28, may be disposed in a fixed relationship for proper use.

The use of the device is as follows: The supply tank 34 is provided with a mass of granular material 49 which has previously been introduced thereinto through the inlet 35. The valve 37 is now moved from its closed position, as seen in Fig. 3, to the open position seen in Fig. 4, so that the granular material is permitted to flow by gravity into the pliable sack-like container 28. Simultaneously, positive air pressure is introduced into the container 28 through the air passage 31, from a pump or other source of both positive and negative air pressure, not shown. This results in the expansion of the container against the interior surface of the mold 44—45, as seen in Fig. 4. At the same time the container is filled with the granular material, any voids in the latter being guarded against, as by agitation.

Thereafter the air pressure is released and valve 37 closed. The bolts 48 are now removed and the mold parts 44 and 45 separated from the filled and shaped container 28. It may likewise be desirable to remove the connections 47 of the bracket 46 so that the latter may be completely segregated from the other parts. Negative air pressure is then applied interiorly of the container 28 through the air passage 31. The result of this application is to render the grains of the mass 49 substantially immovable relative to one another by frictional and interlocking contact so that the filled container 28, as a whole, becomes likewise substantially rigid or solid.

In this condition, that is, with the supply tank 34 still connected with the shaped container 28, the device may be utilized for molding operations, it being understood that the negative air pressure is maintained so that the shaped container 28 retains its characteristics of substantial solidity. It may be pointed out here that the stiffening member 40 aids in such retention, the stop 41 and lateral projections 42 thereon, precluding any movement of the stiffening member relative to the surrounding mass of granular material.

The use of the shaped container 28 as a molding member or core, while the supply tank 34 is still associated therewith, may be convenient where the shaped container is to be used for repeated operations in which it is necessary to return the granular material repeatedly to the supply tank 34.

In cases where the shaped container 28 is to be used in such manner that tank 34 might be in the way, the two members may be separated. For this purpose, a cap 50, Fig. 5, is provided for the threaded flange 33, after the latter has been disconnected from the rotatable collar 39. The cap 50 may be formed in its top face with a threaded socket 51 for rigidly centering the shaped container 28 in a mold, such as the plastic mold shown in Fig. 6. The latter may comprise the separable parts 52 and 53, one of which, such as 52, having a bracket 54 secured to its top and formed with an overhanging arm 55 provided with a threaded bolt 56 projecting therethrough and receivable in the socket 51 of the cap 50 for holding the shaped container or core 28 rigidly centered, as shown.

It will be understood that the space 57 between the shaped container 28 and the encompassing mold parts 52—53 is adapted to be filled with plastic or other molding material, introduced under pressure through a suitable inlet such as 58. After the molding operation has been completed, whether in the use of the connected supply tank 34 and shaped container 28 or in the separated use of the latter as in Figs. 5 and 6, the negative air pressure is released, whereby the fixed relationship of the particles of granular material is immediately broken and the granular material poured out of the pliable container 28, and back into the supply tank 34. The container 28 is of course immediately restored to its loose and pliable condition as seen in Fig. 3, so that it may be withdrawn from the mold along with the stiffening member 40.

It may be desirable to apply pressure to the molding material to aid in its setting and to insure its conforming to the mold. In such case, after the negative pressure is released as described, positive pressure may be applied inside shaped container 28 and the latter expanded for exerting pressure on the molding material.

If the container 28 is of inexpensive material, or if its added weight or strength is desirable, then the container may be left in place after removal of the granular material. The latter too, if desired, may be left in for weight.

It may here be pointed out that the shaped container 28 as seen in Fig. 5, may be utilized for operations not entailing the use of a mold such as 52—53. For example, the shaped container or core 28 may be utilized as a mandrel upon which impregnated tape is wound for forming tubing or other similar construction.

As is well-known, plastics are usually cured by pressure or heat, or both, and in some cases the plastics are of very viscous nature requiring their introduction into the mold under high pressure. The structure of Fig. 7 is provided by the present invention to cope with such situations. In this modification of the invention, the details already described are in all respects the same, with the addition of a second pliable sack or container member 59 embracing the first or inner container 60. The outer covering or container 59 is provided with a separate air passage 61. In use, all of the steps heretofore described in connection with Fig. 6, are carried out up to and including the application of negative air pressure interiorly of the inner shaped container 60. The device is now positioned in the plastic mold of Fig. 7 and the plastic introduced through the passage provided at the bottom of the mold, while a positive pressure is introduced at the top of the space or void 57 as through the relief outlet 57a, usually provided in a mold of this type, a suitable relief valve, not shown, being utilized in connection therewith. This introduction of positive pressure in 57a further strengthens the shaped container member to preclude deforming of the latter by the entering molding material. When the full charge of plastic has been introduced, positive air pressure is injected through the air passage 61 into the outer container member 59, and maintained, whereby the plastic is pressed against the mold for part or all of the curing cycle. Also, the strength of the molding core and its resistance to distortion by the plastic, is thus greatly increased by the use of this differential pressure applied interiorly and exteriorly of the core.

It is to be understood that the core shapes illustrated are merely given by way of example, since the invention makes possible the formation of complicated and irregular cores and molding members such as those involving undercuts.

Another modification of the invention is seen in Figs. 8 and 9. This is particularly useful in the formation of such structure as curved tubing or curvilinear hollow construction generally, which heretofore has necessitated the use of a number of separate molding operations in order to provide for the curved shapes involved, operations which, by the present invention, are reduced to a single molding step. Fig. 8 shows a tubular container 62 which may be formed of flexible expandable or non-expandable material. This device, for the shaping thereof, is adapted to be placed in suitable dies in the same manner as seen in Fig. 3. The granular material 63 is then introduced. The open end of the container 62 has a connection 64 applied thereto and adapted, after filling of the container, to be closed by a cap 65 which is used in the same manner as illustrated in Fig. 6. The connection 64 is formed with interior struts 66 and 67 supporting a rigid stiffening member 68 extending through the upper or straight portions of the container 62, and a flexible stiffener 69 which may extend completely through the container 62.

Negative air pressure is introduced interiorly of the container 62 through an air passage 70 in the connection 64. It may now be explained that the flexible stiffening member 69 is preferably provided with a roughened surface, such as provided by sand-paper, with the result that the application of the negative air pressure causes the particles of the granular material to bind or adhere to the flexible stiffening member whereby the container 62 acquires greater strength in tension, even though it be nothing more than a single strip of material as seen clearly in Fig. 9.

It is likewise contemplated by this invention that strips of flexible, rough surfaced material, 74, Fig. 10, may be utilized as laminations, normally flexible, but when subjected to negative pressure within a container such as 62, becoming a solid non-flexible core. It will be seen also in Fig. 10 that the granular material 72 surrounding this core serves to fill out the contours of the embracing container.

As a substitute for the laminated stiffening strips just described, short fibres might be used, dispersed throughout the granular material and serving, as it were, as individual cores about which the granular material adheres upon the application of negative pressure.

In Fig. 11 another modification is seen, useful for forming intricate shapes in plaster-of-Paris or like material. Thus a box-like receptacle 73 of such material 74 may be provided, the bottom of the receptacle being formed with a reenforced opening 75. The molding core of this invention, under this form, may comprise a hollow membrane shaped, for example, as a hand 76. The open end of the latter is attached to a connection 77 threadedly receivable on a threaded closure 78. The latter has secured thereto, as by a central bolt 79, a plate 80 which closes the aperture 77, and lies on the outer face of the bottom of the receptacle 73, being removably secured thereto as by the bolts 81.

In the use of this device the receptacle 73 is first inverted for positioning the hand-like core 76. The latter may, it will be noted, comprise stiffeners 82 projecting into the extended parts of the molding shape 76 and pivotally connected as at 83 to a cross strut 84 within the connection 77. The shape member 76 in a downwardly projecting position as explained, and filled with its granular material, is now evacuated of air through the passage 85 provided for this purpose and thereafter the whole receptacle 73 is turned to the position seen in Fig. 11 and the material 74, whether it be plaster-of-Paris of molding sand, or otherwise, is placed in the receptacle around the molding shape 76. After hardening of the material 74, the negative air pressure is released from the molding shape 76, the bolts 81 are removed for releasing the plate 80, and the bolt 79, in turn, removed for releasing the plate 80 from the closure 78. When the latter is unscrewed from position, the sand may be poured from the interior of the shape 76 and the latter withdrawn from the hardened material 74, the stiffeners 82 at this time being pivotally moved toward one another to permit withdrawal of the complete molding core from the container 73.

In another modification of the invention seen in Figs. 12 and 13, a tubular slightly stretchable container 86, as of cellophane, is provided. A stiffening rod 87 is preferably extended through the container, projecting therebeyond at both ends. This container is adapted to be filled by gravity, for which purpose a rack 88 is useful for positioning the container 86 vertically during the filling operation. After the latter, the ends of the container 86 are closed and the latter may now be disposed in any position, such as horizontally, in a mold or form 89. The latter may comprise the base 90, the sides 91 and 92 and ends 93. In the side 91 small holes 94 may be formed for receiving the stiffening rod 87, only. The other side 92 of the mold may be provided with larger apertures 95 adapted to have the end portions of the filled containers 86 project therethrough. Assuming that such construction as for example, hollow fence posts are to be formed, partitions 96 may also be made parts of the mold. With all the parts in the positions described, the plastic material such as concrete, is placed in the various compartments of the mold and around the filled containers 86. After solidifying of the molded material, the projecting end of the container 86 is opened and the granular material poured therefrom. The emptied container 86 may likewise be removed if desired, or if it is purposely formed of material such as paper, which need not be recovered, it may simply be left inside the hollow constructions formed, and the stiffening members 87, only, removed. It will be noted in this form of the invention that no vacuum need be applied to the interior of the container 86 since the latter is formed of difficultly expandable material and when it is closed, the force thus applied to the granular material within, results in the frictional binding together of the latter, and interlocking of the particles.

In another form of the invention, a container such as the member 28 in Fig. 5, is formed of rubber-like or other contractible material. This sack-like member is expanded into conformity with a suitable mold, in the manner of Fig. 4, and filled with granular material. In this instance the subsequent application of negative pressure may be omitted since, after the positive expanding air pressure within the container is released, the contractible characteristics of the latter serve to bind the contained granular material in the given shape.

Fig. 14 illustrates a further modification of the invention, particularly useful in the formation of hollow molded construction. The equipment may comprise a mold 97 having positioned therein a tube 98 or other shape of paper or other non-rigid material, having a shaper 99 of similar form disposed thereabout. At the beginning of the process, the shaper 99 is disposed around the lower end portions of the tube 98, as seen in Fig. 14, sand or other granular material is directed from a suitable supply 100 into the tube, and concrete or other molding material 101 is placed in the mold 97 around the shaper 99. The latter is gradually withdrawn, as indicated in Fig. 14, from those portions of the tube 98 in which the level of granular material is substantially above the level of the concrete. In such portions of the tube 98, the sand has become solidly positioned and the granules thereof are locked by the force of the surrounding concrete. After completion of the progressive process described, and hardening of the concrete, the core of sand may be poured out.

Special forms of granular material may be employed in connection with the present invention. For example, the core-forming sack may be filled with heat conducting granules, such as metal, to provide heat by induction and high frequency currents, to the surrounding molding material, for treating or curing the latter. The granules may likewise comprise suitable chemical ingredients rendering them self-heating, for the same purpose. Moreover, the invention likewise contemplates the use of steam and hot liquids in place of air, to provide heat where needed, for example, between the two sack-like parts of the double container member seen in Fig. 7.

In some instances, the sack-like container may be of permeable or pervious material, and the filled sack employed as a filter-leaf or filtering shape. In this instance, the filled and shaped sack, immersed in a suitable receptacle of liquid, has a pressure of liquid passed through its pores or mesh, with a pressure drop or differential at the outer surface of the sack-like member. This differential pressure results in maintenance of the given shape of the filled container. A core of this kind would be useful, for example, in the concentration of fibres, to form fibrous layers, for use as covering material and for numerous other purposes.

The size, shape, strength, mixture, and surface condition of the granules employed in connection with the present invention can be specifically predetermined, in order to give various properties desired in the shape formed.

It may be remarked here that the stiffening members heretofore disclosed may, under some circumstances, be of tubular formation provided with filter covered perforations along the length thereof, so that the stiffener may likewise be utilized for the application and immediate and even distribution of pressures within the granular mass surrounding the tube-like stiffener.

Various other modifications will suggest themselves upon consideration of the means and methods herein disclosed, but these are believed to be comprised within the spirit and scope of the invention.

What is claimed is:

1. The process of making a molding form or core, which comprises expanding an airtight sack or the like into contact with an adjacent die and filling the sack with granular material, evacuating air from the sack for rendering the mass of granular material substantially rigid, removing the die, and maintaining the vacuum in the shaped sack while the latter is utilized as a molding form or core.

2. The process of making a molding form or core, which comprises expanding an airtight sack or the like into contact with an adjacent die and filling the sack with granular material, inserting a stiffening rod or the like into the material in the sack, evacuating air from the sack for rendering the mass of granular material substantially rigid, removing the die, and maintaining the vacuum in the shaped sack while the latter is utilized as a molding form or core.

3. A process for molding hollow objects and comprising conforming to a desired shape an airtight sack of granular material having a suitable stiffening member inserted therein, evacuating air from the sack whereby the granular material therein is rendered substantially rigid, maintaining the vacuum in the shaped sack while the latter is utilized as a molding core, releasing the vacuum after the molding operation to free the granular material from its given rigid shape, and removing at least the granular material and the stiffening member from the interior of the hollow molded object.

4. The process of molding which comprises conforming an airtight double sack to a surrounding die or mold and filling the inner sack with granular material, applying and maintaining negative air pressure in the inner sack, introducing molding material into the mold around the outer sack, and subsequently introducing positive fluid pressure between the two sacks.

5. Core-forming apparatus for use in molding and comprising a pliable fluid-tight container, a die for receiving the container, a fluid-tight holder containing granular material, a valve controlled, fluid-tight, transfer conduit member connecting the container and the holder, and means to selectively and forcibly introduce and withdraw fluid into and from the container independently of said transfer conduit.

6. Core-forming apparatus for use in molding and comprising an air-tight pliable container, a die for receiving the container, a fluid-tight holder containing granular material, a closable conduit means between the container and holder for transferring granular material to the former from the latter, fluid pressure means for expanding the container into conformity with the die for reception of granular material, means for forcibly withdrawing fluid from the filled and shaped container independently of the holder whereby the container is rigidified and means for sealing the container in the latter condition.

7. Core-finding apparatus for use in molding and comprising an air-tight pliable container, a die for receiving the container, an air-tight holder containing granular material, conduit means between the container and holder for transferring granular material to the former from the latter, air pressure means for expanding the container into conformity with the die for reception of the granular material to fill said container from said holder, a stiffening member in the container in contact with the mass of granular material, means for cutting off communication through the conduit means between said container and holder and means for exhausting air from the container to reduce the air pressure therein below that of the exterior of the container for rigidifying the filled and shaped container during use as a core.

8. Core-forming apparatus for use in molding and comprising an airtight pliable container, a die or mold for receiving the container, an air-tight holder containing granular material, conduit means between the container and holder for transferring granular material to the former from the latter, means to introduce air under pressure into the container for expanding the container into conformity with the die for reception of the granular material, and means for forcibly evacuating air from the filled shaped container for substantially rigidifying the same for use as a molding core during such evacuation.

9. Hollow molding apparatus comprising a double air-tight sack-like container, a mold for enclosing the outer container, an air-tight holder containing granular material, means providing a controlled communicating connection between said holder and the innermost container whereby granular material from the holder is transferable to said inner container, air conduit means connecting with the interiors of the respective containers, the air conduit means to the inner container adapted for connection with a means to positively and selectively introduce and exhaust air permitting positive pressure expansion of the containers to conform to the mold and during filling of the inner container with granular material from the holder for forming a core and permitting subsequent exhausting of air from said interior container to reduce the air pressure therein below that of the external surrounding fluid medium whereby the core is rigidified, means for sealing communication between the holder and the inner container, a mold for plastic material adapted to receive the rigidified core thus formed and a surrounding body of plastic material to be molded, and means for introducing positive air pressure to the air conduit of the outer container for expanding the outer container to exert compressive force on the outside of the inner core and on the inside of the plastic mass in the mold.

10. Molding apparatus comprising a container of sheet like pliable material, a fluent granular mass in said container, a flexible member disposed in said mass in said container, means for positively withdrawing fluid interiorly of the container to establish therein a pressure below the pressure on the exterior of the container to effect interlocking and adherence between the grains of said mass whereby the latter is substantially rigidified, and means on said flexible member to effect adherence of the surrounding granular mass thereto whereby said flexible member is likewise substantially rigidified.

11. The process of molding which comprises expanding an expandable container to conformity with a core mold, filling the container with granular solid material, setting up a reduced fluid pressure within the container and sealing it to rigidify the container and contents, transferring the container as a rigid core to a mold, injecting moldable material into the mold around the core and then introducing positive pressure interiorly of the container.

12. The process of molding which comprises forming a double walled sack to a desired shape, filling the inner sack with angular granular material, setting up and maintaining reduced fluid pressure within said shaped filled inner sack for rigidifying it in said desired shape, then transferring the filled and shaped double sack as a rigid core to a mold, injecting molding material into the mold around said core, then introducing fluid pressure between the inner and outer parts of said double sack for compressing the molding material in the mold, then relieving the pressure, emptying the inner sack of its granular content and removing the double sack.

13. The process of molding which comprises introducing a flexible double walled sack into a core mold, expanding the inner sack whereby said double sack conforms to the core mold, filling the inner sack with angular granular material while the double sack is in an expanded and shaped condition, closing the inner sack, setting up and maintaining reduced fluid pressure in the inner sack whereby the granular material is rigidified, removing said rigidified filled double sack and placing it as a core in a mold, injecting molding material into the mold around said rigidified core, then introducing fluid heat and pressure between the inner and outer parts of the double sack.

14. The process of molding which comprises inserting an air-tight sack into a core mold expanding the sack with pressure air to conform to the core mold, filling the sack with granular material to form a core shape, withdrawing air from the sack to reduce air pressure therein below that of the external fluid medium for rigidifying the core shape, maintaining the core in said rigidified condition and transferring it to a die, introducing molding material into the die around the core, and introducing pressure fluid interiorly of the sack for compressing the molding material against the die and then relieving the fluid pressure.

15. The process of forming a temporary shape which comprises expanding an airtight sack or the like into contact with an adjacent die and filling the sack with a mass of granular material, evacuating air from the sack for rendering the mass substantially rigid, removing the die and maintaining the vacuum during the time it is desired to retain the shape so formed.

16. The process of molding which comprises inserting a rod-like stiffening element into an air-tight double sack and conforming said sack to a surrounding mold, filling the inner sack with angular granular material, then withdrawing air from the inner sack to reduce the air pressure therein below the pressure of the external surrounding medium for rigidifying the inner sack and its contents, temporarily sealing said sack and placing it in a die, introducing molding material into a die around the outer sack and then introducing positive fluid pressure between the two sacks while maintaining the inner sack sealed and finally normalizing the pressure between the sacks and removing the pressure treated molded material and core from the die.

17. The process of molding heat treatable materials which comprises the steps of filling an air-tight, double walled flexible container with granular material, shaping the filled container in a mold, exhausting the fluid in the container to rigidify the container and granular contents, transferring the rigidified shaped container to a die, injecting heat treatable material into the die and introducing a fluid heating medium between the walls of the double walled container for subjecting the injected heat treatable material to heat and pressure.

GEORGE C. LUEBKEMAN.

REFERENCES CITED

The following references are of record in the file of this patent:

UNITED STATES PATENTS

| Number | Name | Date |
|---|---|---|
| Re. 20,460 | Jeffery | Aug. 3, 1937 |
| 139,274 | Sprogle | May 27, 1873 |
| 143,384 | Semple | Sept. 30, 1873 |
| 720,718 | Maddock et al. | Feb. 17, 1903 |
| 1,047,594 | Trump | Dec. 17, 1912 |
| 1,154,255 | Landis | Sept. 21, 1915 |
| 1,801,346 | Heath | Apr. 21, 1931 |
| 1,856,394 | Lettermann | May 3, 1932 |
| 2,052,818 | Freyssinet et al. | Sept. 1, 1936 |
| 2,057,039 | MacDonald | Oct. 13, 1936 |
| 2,084,534 | Martin et al. | June 22, 1937 |
| 2,145,941 | Maxfield | Feb. 7, 1937 |
| 2,277,288 | Berch | Mar. 24, 1942 |
| 2,280,074 | Halsall | Apr. 21, 1942 |